US008489322B2

(12) United States Patent
Miyajima

(10) Patent No.: US 8,489,322 B2
(45) Date of Patent: Jul. 16, 2013

(54) COURSE GUIDANCE SYSTEM, COURSE GUIDANCE METHOD, AND COURSE GUIDANCE PROGRAM

(75) Inventor: Takayuki Miyajima, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 0 days.

(21) Appl. No.: 13/357,022

(22) Filed: Jan. 24, 2012

(65) Prior Publication Data

US 2012/0197521 A1 Aug. 2, 2012

(30) Foreign Application Priority Data

Jan. 31, 2011 (JP) ................................ 2011-018445

(51) Int. Cl.
*G01C 21/34* (2006.01)
(52) U.S. Cl.
USPC ......... 701/411; 701/437; 701/533; 340/995.2
(58) Field of Classification Search
USPC ................ 701/408–412, 431, 437, 532, 533; 340/995.1, 995.19, 995.2
See application file for complete search history.

(56) References Cited

U.S. PATENT DOCUMENTS

| | | | | |
|---|---|---|---|---|
| 4,782,447 A | * | 11/1988 | Ueno et al. | 701/431 |
| 5,938,718 A | * | 8/1999 | Morimoto et al. | 701/431 |
| 5,983,158 A | * | 11/1999 | Suzuki et al. | 701/425 |
| 6,249,740 B1 | * | 6/2001 | Ito et al. | 701/420 |
| 6,269,305 B1 | * | 7/2001 | Yamashita et al. | 701/533 |
| 6,356,840 B2 | * | 3/2002 | Kusama | 701/437 |
| 6,826,475 B2 | * | 11/2004 | Sugiura et al. | 701/417 |
| 6,934,627 B2 | * | 8/2005 | Kawakami et al. | 701/437 |
| 7,698,063 B2 | * | 4/2010 | Kim | 701/437 |
| 2002/0013659 A1 | * | 1/2002 | Kusama | 701/211 |
| 2002/0128768 A1 | * | 9/2002 | Nakano et al. | 701/202 |
| 2007/0021907 A1 | | 1/2007 | Kato et al. | |
| 2011/0054783 A1 | * | 3/2011 | Kishikawa et al. | 701/209 |

FOREIGN PATENT DOCUMENTS

JP A 2007-051999 3/2007

OTHER PUBLICATIONS

Guo et al, T. Safety Evaluation for Freeway Exit Ramp Based on Speed Consistency, Journal of Transportation Systems Engineering and Information Technology, vol. 10, Iss. 6, Dec. 2010, pp. 76-81.*
O'Flaherty, C.A. Chapter 20—Intersection Design and Capacity, Transport Planning and Traffic Engineering, 1997, pp. 356-399.*

* cited by examiner

*Primary Examiner* — Russell Frejd
(74) *Attorney, Agent, or Firm* — Oliff & Berridge, PLC

(57) ABSTRACT

Course guidance systems, methods, and programs determine that a vehicle is exiting from a facility to an out-of-facility road via an exit lane, and determine an estimated connection angle of the exit lane at an exit/entrance node. The systems, methods, and programs generate course guidance information based on the determined estimated connection angle when the vehicle is determined to be exiting. Based on the vehicle location information and the road information, the systems, methods, and programs detect whether an actual traveling road and the guidance road differ. Based on the vehicle location information and the road information, the systems, methods, and programs correct the estimated connection angle at the exit/entrance node based on a relative angle between the actual traveling road and the guidance road, and record the corrected estimated connection angle.

17 Claims, 8 Drawing Sheets

FIG. 1
(#1) EXIT FROM FACILITY IS DETECTED
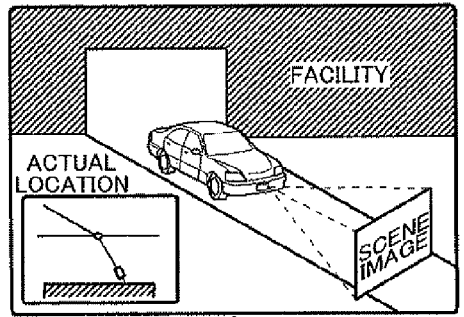
(#2) EXIT/ENTRANCE NODE AND ROAD LINK ARE ACQUIRED
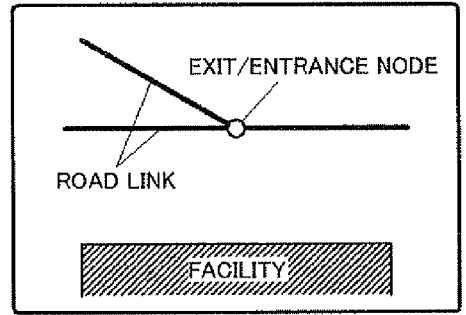
(#3) ESTIMATED CONNECTION ANGLE IS DETERMINED
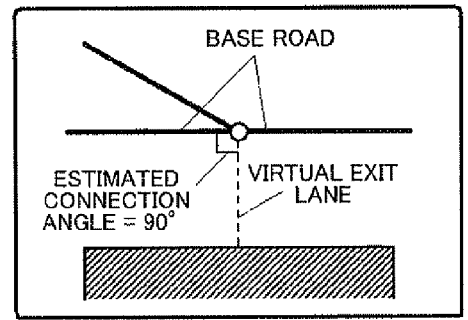
(#4) ROUTE INFORMATION IS ACQUIRED
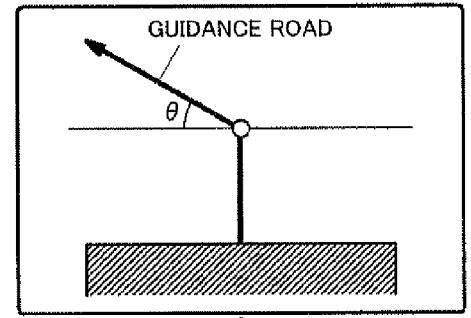
(#5) COURSE GUIDANCE IS OUTPUT
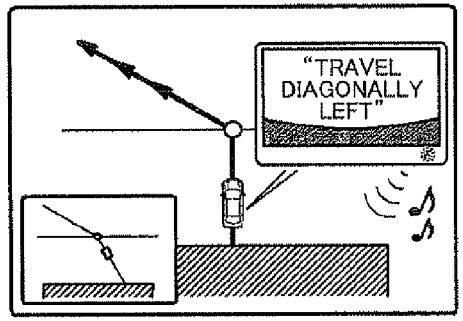
(#6) MAP MATCHING IS PERFORMED
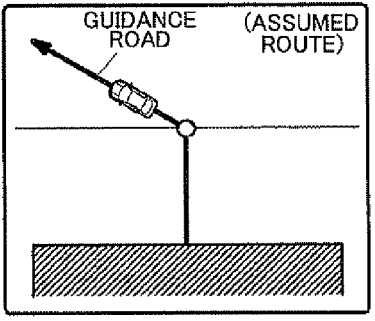
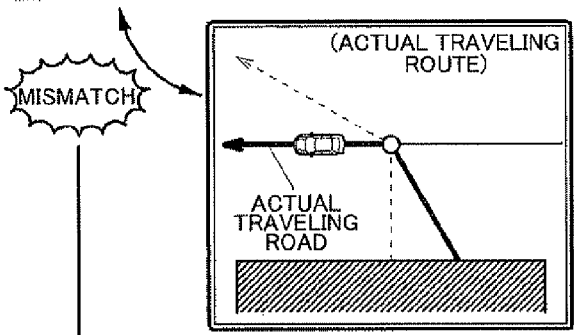
ANGLE CORRECTION REQUEST
(#7) ESTIMATED CONNECTION ANGLE IS CORRECTED
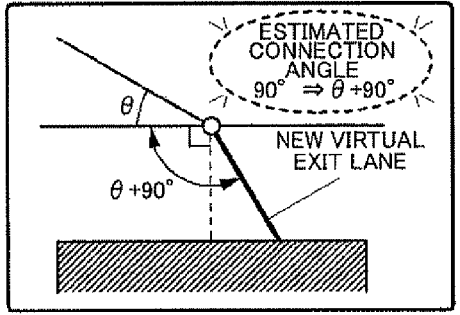

FIG. 5

30 COURSE GUIDANCE INFORMATION GENERATION

33 IS ESTIMATED CONNECTION ANGLE RECORDED?
- NO → #34 DETERMINE INITIAL ESTIMATED CONNECTION ANGLE AS ESTIMATED CONNECTION ANGLE
- YES → #35 READ ESTIMATED CONNECTION ANGLE

36 DETERMINE ESTIMATED CONNECTION ANGLE

37 READ CONNECTION ANGLE OF GUIDANCE ROAD

38 CALCULATE ENTERING ANGLE FROM EXIT LANE TO GUIDANCE ROAD

39 CREATE COURSE INFORMATION BASED ON ENTERING ANGLE

RETURN

COURSE GUIDANCE SYSTEM, COURSE GUIDANCE METHOD, AND COURSE GUIDANCE PROGRAM

INCORPORATION BY REFERENCE

The disclosure of Japanese Patent Application No. 2011-018445, filed on Jan. 31, 2011, including the specification, drawings, and abstract is incorporated herein by reference in its entirety.

BACKGROUND

1. Related Technical Fields

Related technical fields include course guidance systems that give guidance information on a road from the exit/entrance of a facility, such as a parking lot, to the traveling destination when the vehicle leaves the facility.

2. Related Art

A conventional technology is disclosed, for example, in Japanese Patent Laid-Open Publication No. 2007-51999 (paragraphs 0003-0025, 0042-0055, FIG. 6) that describes a navigation device for identifying a connection point, which indicates the connection between the out-of-facility road outside a facility where a vehicle is located and the in-facility road, to give the guidance information on the direction, in which the vehicle will travel at the connection point, with respect to the traveling direction of the vehicle. This device determines if the vehicle has approached the facility exit guidance point (for example, if the distance from the vehicle location to the facility exit guidance point is equal to or shorter than a predetermined distance). If the vehicle has approached the facility exit guidance point, the device outputs exit branch guidance information indicating a direction to a predetermined route before the vehicle exits from the facility exit guidance point (after-exit guidance information on the traveling direction in which the vehicle will travel after leaving the facility through the exit). In this case, if the guidance route is in the left direction of the facility exit guidance point, the device outputs a screen display on the display or a voice message for guidance (for example "turn left at the exit").

SUMMARY

The conventional device, such as the one described above, allows a driver to know, at a point before the exit of the facility, in which direction to travel when the vehicle goes into an out-of-facility road through the exit of the facility. In this case, if the exit is connected to only one out-of-facility road, the guidance information "right direction" or "left direction" is recognized correctly in most cases. However, if the out-of-facility road to which the exit is connected is near to a multi-way intersection or if the exit is connected directly to an intersection, detailed guidance information such as "diagonally right direction," "diagonally left direction," "90 degrees right direction," or "90 degrees left direction," is necessary to provide correct guidance on the road to which a vehicle is to enter after exiting from an exit. Such guidance requires information on the angle between the facility exit lane, which connects the facility exit and the out-of-facility road, and the out-of-facility road; however, the road information usually includes information on the exit/entrance node location that is the connection point between the exit lane and the out-of-facility road, but not on the connection angle in many cases. Therefore, if the out-of-facility road to which the exit is connected is near to a multi-way intersection or if the exit is connected directly to an intersection, it is difficult to give accurate course guidance sometimes with the result that a driver cannot drive on a guidance road that is intended.

Therefore, there is an increasing need for a technology for course guidance as accurate as possible even if the out-of-facility road to which the exit is connected is near to a multi-way intersection or if the exit is connected directly to an intersection.

Exemplary implementations of the broad inventive principles described herein provide a vehicle location information acquisition unit that acquires vehicle location information indicating a current location of a vehicle; a road information acquisition unit that acquires road information including information on a road link and information on an exit/entrance node, the road link indicating an out-of-facility road, the exit/entrance node indicating a location of an exit/entrance of a facility that has the exit/entrance connected to the road; a facility exit determination unit that determines that the vehicle is exiting from the facility to the road; an estimated connection angle determination unit that determines an estimated connection angle, the estimated connection angle being an estimated connection angle of an exit lane in the facility at the exit/entrance node, the exit lane connected to the exit/entrance node; an after-exit guidance information generation unit that generates course guidance information based on the determined estimated connection angle when the vehicle is determined to be exiting, the course guidance information being guidance on a traveling direction to a guidance road, the guidance road being the road forming a guidance route on which the vehicle will travel after exiting from the exit lane; and a connection angle evaluation unit that corrects the estimated connection angle at the exit/entrance node based on a relative angle between an actual traveling road and the guidance road if it is detected that, based on the vehicle location information and the road information, the actual traveling road and the guidance road differ and records the estimated connection angle that has been corrected, the actual traveling road being a road on which the vehicle will travel after exiting from the exit lane.

According to this configuration, the actual connection angle between the exit lane and the road at the exit/entrance node, which is the connection point between the exit lane and the road to which the exit lane is connected, cannot be identified from the road information. Therefore, this connection angle is estimated as an estimated connection angle. And, based on the estimated angle, the system generates guidance information for entering the guidance road from the exit lane and notifies the generated guidance information to the driver. This guidance information, which is based on the estimated connection angle, is not always accurate. Therefore, in some cases, the actual traveling road selected by the driver according to this guidance information is not a right guidance road. In this case, the system corrects the estimated connection angle based on the relative angle between the actually traveled road and the correct guidance road. The corrected connection angle, usually closer to the actual connection angle than the estimated connection angle, may be used at the next course guidance time to provide better course guidance.

To properly correct the estimated connection angle described above, the driver is required to select a guidance road according to the course guidance. However, the final course is selected by the driver and, sometimes, the selected course is not the course provided by the course guidance. To alleviate such a problem, if the course guidance is provided for the same exit/entrance node multiple times, one solution is to calculate the average of the relative angles between the traveling road and the guidance road and to use the averaged relative angle to correct the estimated connection angle. Therefore, according to exemplary implementations, if it is detected a predetermined number of times that the traveling road differs from the guidance road at the exit/entrance node, the connection angle evaluation unit may correct the estimated connection angle at the exit/entrance node based on a relative angle between the traveling road and the guidance road at each of the predetermined number of times.

If such a corrected estimated connection angle is available for use, the guidance information, which is created for the guidance road based on the corrected estimated connection angle, would provide better course guidance. Therefore, according to exemplary implementations, the estimated connection angle determination unit may determine the estimated connection angle using a corrected estimated connection angle if the corrected estimated connection angle is recorded, or using a predetermined initial estimated connection angle if the corrected estimated connection angle is not recorded, the corrected estimated connection angle being the estimated connection angle that has been corrected.

The disclosed technology is effective when the exit/entrance node, which is the connection point between the exit lane of the facility and an out-of-facility road, is at an intersection and therefore there are multiple out-of-facility roads connecting to the exit lane or when the exit/entrance node is near to an intersection. Note that, when the exit/entrance node is some distance from an intersection, the course guidance from the exit lane and the course guidance from the guidance road (intersection guidance) should temporally be separated, assuming that the exit lane connects to one road only, to provide easier-to-understood course guidance. Therefore, according to exemplary implementations, the road information may include information on an intersection node indicating an intersection of a plurality of the roads and, if the exit/entrance node is located within a predetermined distance from the intersection node, processing by the connection angle evaluation unit may be performed. For example, the connection angle evaluation unit should perform processing only when the exit/entrance node is 20 meters or shorter, preferably, 10 meters or shorter, from an intersection node.

In addition, a course guidance method and a course guidance program, which provide course guidance on a guidance road when a vehicle is exiting from a facility to an out-of-facility road via an exit, provided. For example, the course guidance method includes the steps of acquiring vehicle location information indicating a current location of a vehicle; acquiring road information including information on a road link and information on an exit/entrance node, the road link indicating an out-of-facility road, the exit/entrance node indicating a location of an exit/entrance of a facility that has the exit/entrance connected to the road; determining that the vehicle is exiting from the facility to the road; determining an estimated connection angle, the estimated connection angle being an estimated connection angle of an exit lane in the facility at the exit/entrance node, the exit lane connected to the exit/entrance node; generating course guidance information based on the determined estimated connection angle when the vehicle is determined to be exiting, the course guidance information being guidance on a traveling direction to a guidance road, the guidance road being the road forming a guidance route on which the vehicle will travel after exiting from the exit lane; and correcting the estimated connection angle at the exit/entrance node based on a relative angle between an actual traveling road and the guidance road if it is detected that, based on the vehicle location information and the road information, the traveling road and the guidance road differ and recording the estimated connection angle that has been corrected, the actual traveling road being a road on which the vehicle will travel after exiting from the exit lane.

The course guidance program causes a computer to perform the functions of acquiring vehicle location information indicating a current location of a vehicle; acquiring road information including information on a road link and information on an exit/entrance node, the road link indicating an out-of-facility road, the exit/entrance node indicating a location of an exit/entrance of a facility that has the exit/entrance connected to the road; determining that the vehicle is exiting from the facility to the road; determining an estimated connection angle, the estimated connection angle being an estimated connection angle of an exit lane in the facility at the exit/entrance node, the exit lane connected to the exit/entrance node; generating course guidance information based on the determined estimated connection angle when the vehicle is determined to be exiting, the course guidance information being guidance on a traveling direction to a guidance road, the guidance road being the road forming a guidance route on which the vehicle will travel after exiting from the exit lane; and correcting the estimated connection angle at the exit/entrance node based on a relative angle between an actual traveling road and the guidance road if it is detected that, based on the vehicle location information and the road information, the traveling road and the guidance road differ and recording the estimated connection angle that has been corrected, the actual traveling road being a road on which the vehicle will travel after exiting from the exit lane. Of course, the course guidance method and the course guidance program also can achieve the effect similar to the one given in the description of the course guidance system described above and, in addition, some additional technologies described in the preferred examples can also be included.

BRIEF DESCRIPTION OF THE DRAWINGS

FIG. 1 is a diagram schematically showing the basic principle used in a course guidance system, a course guidance program, and a course guidance method using an example in which a vehicle travels from a parking lot to an out-of-facility road based on course guidance;

FIG. 5 is a flowchart showing the course guidance information creation algorithm used in the main algorithm;

DETAILED DESCRIPTION OF EXEMPLARY IMPLEMENTATIONS

Figure 2:
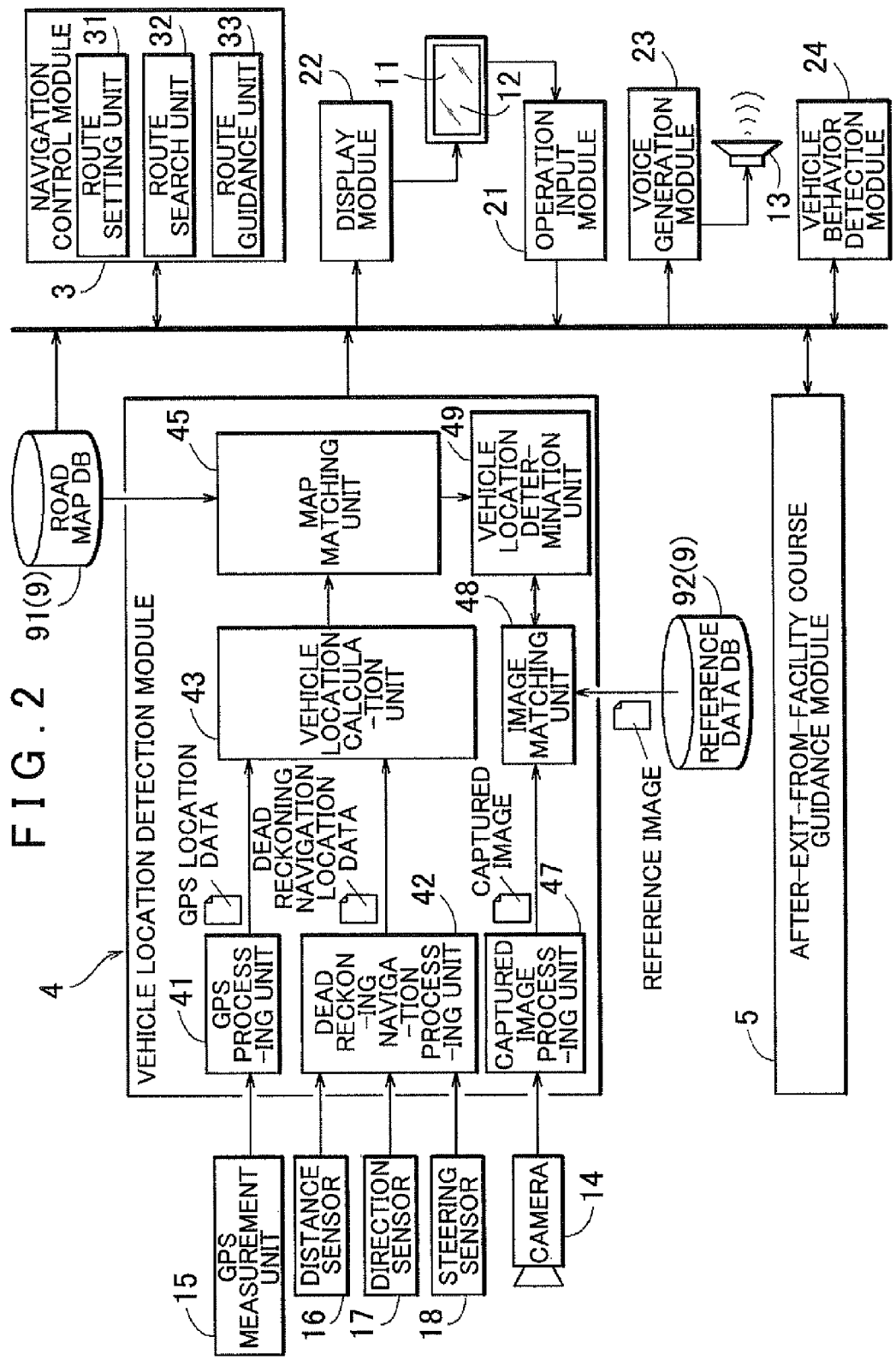
FIG. 2 is a functional block diagram showing a vehicle navigation device that employs the course guidance system.

Before describing a detailed example of a course guidance system, the following describes the basic principle with reference to FIG. 1. When a vehicle leaves a facility, such as a parking lot or a factory, through the exit/entrance, this course guidance system gives guidance on the traveling direction in the out-of-facility road connected to the exit/entrance. FIG. 1 is a diagram schematically showing the basic processing flow when course guidance is performed at an intersection connected to the exit lane that is the exit/entrance of a facility.

When a vehicle attempts to leave a facility through the exit/entrance of the facility, the system detects that the vehicle is leaving the facility via the exit lane based on the vehicle traveling status obtained by image matching that is combined with the vehicle location approximately calculated using the GPS information and the map information (#1). Note that, though the illustration in #1 in FIG. 1 schematically shows the vehicle that is actually traveling, the course guidance system does not know the accurate location of this vehicle. When it is detected that the vehicle is leaving the facility, the system obtains the exit/entrance node connected to the exit/entrance of this facility as well as the road link to generate course guidance for notifying about the traveling direction in the out-of-facility road to which the exit lane is connected (#2). In this example, the exit lane is connected to an exit/entrance node (intersection) that has three possible courses. That is, the exit/entrance node, which is set on a road link indicating an out-of-facility road and which indicates the point of exit from or entrance into the facility, matches the intersection node of this intersection.

Upon receiving a course guidance request, the course guidance system starts the generation of course guidance information. To do so, the course guidance system first references the destination information and the route information on the destination, which are set in advance by the car navigation system, to identify the guidance road starting at the intersection (exit/entrance) to which this exit lane is connected. In addition, to determine the direction of the guidance road, which is the course from the intersection (exit/entrance), with respect to the traveling direction of the vehicle that is traveling in the exit lane, the system calculates the connection angle of the exit lane with the exit/entrance node (which matches the intersection node in this case), that is, the angle between the road link of the base road, one of the out-of-facility roads passing through this exit/entrance node, and the exit lane. Because such connection angle information is not included in the road information, the system estimates this angle. In the description below, this angle is assumed perpendicular to the road link (90 degrees) and is called an estimated connection angle (#3). As shown in the illustration in #3, the exit lane defined by the connection angle estimated in this way is indicated virtually as the dotted line. To calculate the connection angle at the exit/entrance node of the exit lane, the base road must be set. The base road is one of the out-of-facility roads to which the exit/entrance of the facility is connected. Preferably, the base road is a road whose road link, which extends through the exit/entrance node representing the point of connection with the exit/entrance, forms one straight line across both sides of the exit/entrance node. Alternatively, a major road, which is one of the roads connected to the exit/entrance node and is widest or has the largest number of lanes, may preferably be determined as the base road. A road whose road attribute indicates a trunk road may also be determined as the base road. In addition, the road nearest to a predetermined longitude line or a predetermined latitude line on an absolute direction basis may be used as the base road. The predetermined angle in the clockwise direction or in the counterclockwise direction with respect to this base road is the estimated connection angle.

The guidance route can be identified from the route information obtained by the route search, and the connection angle θ of the guidance road, which extends from the exit/entrance node (intersection mode), at the exit/entrance node can be read from the road information. By using this connection angle, the direction (traveling direction) of the guidance road with respect to the traveling direction of the vehicle can be calculated (#4). In this example, with the connection angle of the road link of the major road being 0 degree, the traveling direction is at an angle of θ in the clockwise direction. Based on the calculated traveling direction and the estimated connection angle of the exit lane, the course guidance information is generated. For example, the content of this course guidance information, which is output from the speaker as the voice information, is "travel diagonally left" (#5).

After the driver selects a road according to the notified course guidance information and passes the intersection, the system checks next if the vehicle is traveling on the guidance road that is intended (#6). In this checking, the map matching processing is used in which a check is made if the vehicle location determined by the vehicle location information matches the guidance road determined by the road information. The map matching processing has the function to correct the vehicle location so that the calculated vehicle location is located on the nearest road. In this system, the result of the map matching processing is used to detect if the road on which the vehicle is traveling (actual traveling road) is different from the guidance road. If the actual traveling road does not match the guidance road, it is assumed that the error is caused by an error in the estimated connection angle, and an angle correction request is issued to correct the estimated connection angle (#7).

In this example, as shown in the two illustrations in #6, the actual traveling road on which the vehicle actually traveled is the major road connected to the exit/entrance node (intersection node), and this actual traveling road does not match the guidance road. Therefore, though the vehicle is assumed to travel on the guidance road at first, the map matching processing is performed as shown in the illustration in #7 to change the vehicle location to the actual traveling road (major road). To correct the estimated connection angle, the system first calculates the relative angle between the guidance road and the actual traveling road (in this example, the angle between the guidance road and the actual traveling road is assumed to be θ). According to the guidance message "travel diagonally left" created assuming that the estimated connection angle is 90 degrees, the driver, who actually drives the vehicle in the actual exit lane instead of the virtual exit lane with the 90 degrees of the estimated connection angle, drives on the major road instead of the guidance road. From this fact, it is considered that the connection angle of the actual exit lane is shifted the angle of θ in the counterclockwise direction from 90 degrees. This means that the estimated connected angle should be corrected by an angle of θ. For example, when θ is 30 degrees, the corrected estimated connection angle is 120 degrees. The corrected estimated connection angle, which is generalized, is represented as $\lambda+\theta$, where is the estimated connection angle and θ is the angle difference that is relative angle between the guidance road and the actual traveling road (signed angular operation is assumed with the counterclockwise direction as the plus direction). The corrected estimated connection angle calculated in this way is recorded in the memory or the like for use in the next operation. To increase the reliability of the corrected estimated connection angle, the statistical calculation, for example, the average operation, may be performed for multiple corrected estimated connection angles if such multiple corrected estimated connection angles are recorded for the same location under the same condition (the same destination).

FIG. 2 is a functional block diagram showing an example of a vehicle navigation device that employs a course guidance system operating based on the basic principle of operation described above. This vehicle navigation device has the function to correct the vehicle location based on image matching, wherein the vehicle location is calculated by the location measuring function that uses GPS and the location measuring function that uses dead reckoning navigation (hereinafter simply called a vehicle location). To implement this function, the reference images created in advance for image matching are stored in a reference image DB 92 as a database. FIG. 2 shows the functional block diagram in which such a vehicle navigation device is included in an in-vehicle LAN. This vehicle navigation device includes an operation input module 21, a navigation control module 3, a vehicle location detection module 4, an after-exit-from-facility course guidance module 5, and a database 9 having the reference image DB 92 described above and a road map database 91 (hereinafter simply abbreviated road map DB) that stores road map data.

The navigation control module 3 includes a route setting unit 31, a route search unit 32, and a route guidance unit 33. The route setting unit 31 sets information on the start location such as the vehicle location, received destination, pass-through locations, and traveling conditions (for example, whether to use highway). The route search unit 32 is a processing unit that performs operation processing for searching for a guidance route from the start location to the destination based on the conditions specified by the route setting unit 31. The route guidance unit 33 is a processing unit that performs the operation processing, via visual notification by the display screen of a monitor 12 and audio notification by a speaker 13, for giving appropriate route guidance to the driver according to the route from the start location to the destination searched for by the route search unit 32.

The vehicle location detection module 4 has the function to correct an estimated vehicle location, obtained by the conventional methods such as the location calculation via GPS and the location calculation via dead reckoning navigation, with the vehicle location determined by the image matching that uses the estimated vehicle location. The vehicle location detection module 4 includes a GPS processing unit 41, a dead reckoning navigation processing unit 42, a vehicle location calculation unit 43, a map matching unit 45, a captured image processing unit 47, an image matching unit 48, and a vehicle location determination unit 49. To the GPS processing unit 41, a GPS measurement unit 15 that receives the GPS signal from a GPS satellite is connected. The GPS processing unit 41 analyzes the signal from the GPS satellite received via the GPS measurement unit 15, calculates the current location (longitude and latitude) of the vehicle, and transmits the calculated current location to the vehicle location calculation unit 43 as the GPS location data. To the dead reckoning navigation processing unit 42, a distance sensor 16 and a direction sensor 17 are connected. The distance sensor 16 is a sensor for detecting the vehicle speed and the travel distance of the vehicle. The distance sensor 16 outputs the information on the vehicle speed and the travel distance, obtained as the detection result, to the dead reckoning navigation processing unit 42. The direction sensor 17 outputs the information on the vehicle traveling direction to the dead reckoning navigation processing unit 42. The dead reckoning navigation processing unit 42 calculates the dead reckoning navigation location based on the travel distance information and the direction information that are received constantly and transmits the calculation result to the vehicle location calculation unit 43 as the dead reckoning navigation location data. The vehicle location calculation unit 43 performs the calculation for identifying the location of the vehicle by a known method using the GPS location data and the dead reckoning navigation location data. Because the calculated vehicle location information includes measurement errors and, in some cases, indicates a location not on a road, the map matching unit 45 corrects the vehicle location to a location on a road in the road map. The vehicle location information corrected in this way is transmitted to the vehicle location determination unit 49 as the estimated vehicle location information.

The captured image processing unit 47 generates a recognition-use captured image, suitable for image recognition (image matching in this case), from the scene-captured image viewed from the vehicle and captured by an in-vehicle camera 14 (for example, captured image of a scene in front of the vehicle). The image matching unit 48 performs matching between the reference image, extracted from the reference image DB 92, and the recognition-use captured image output from the captured image processing unit 47. If the pattern matching is successful, the capturing location related to the reference image, which is a matching pattern, is read. This capturing location is determined as the vehicle location and transmitted to the vehicle location determination unit 49. The vehicle location determination unit 49 corrects the vehicle location by substituting the transferred vehicle location for the estimated vehicle location. The reference image includes, for example, the scene of driving in the exit lane that is the exit/entrance of the facility such as a parking lot and, based on the matching between the reference image and the recognition-use captured image, it is determined that the vehicle is exiting from the facility into the out-of-facility road. Therefore, when it is determined that the vehicle is exiting from the facility, such as a parking lot, into the out-of-facility road, the vehicle location determination unit 49 functions to include the information to this effect in the vehicle location information and then output the information.

The vehicle navigation device has the following peripheral devices: operation input module 21 that converts an operation input, received from input devices such as an touch panel 11 or switches not shown, to an appropriate operation signal and transfers the converted signal to the internal components, a display module 22 that displays image information, required for various types of guidance, on the monitor 12, a voice generation module 23 that outputs voice information, required for various types of guidance, from the speaker 13 or the buzzer, and a vehicle behavior detection module 24 that converts various types of vehicle behavior detection data, such as the steering operation amount, braking, and acceleration, to the vehicle behavior information and transfers the converted vehicle behavior information to the internal components.

Figure 3:
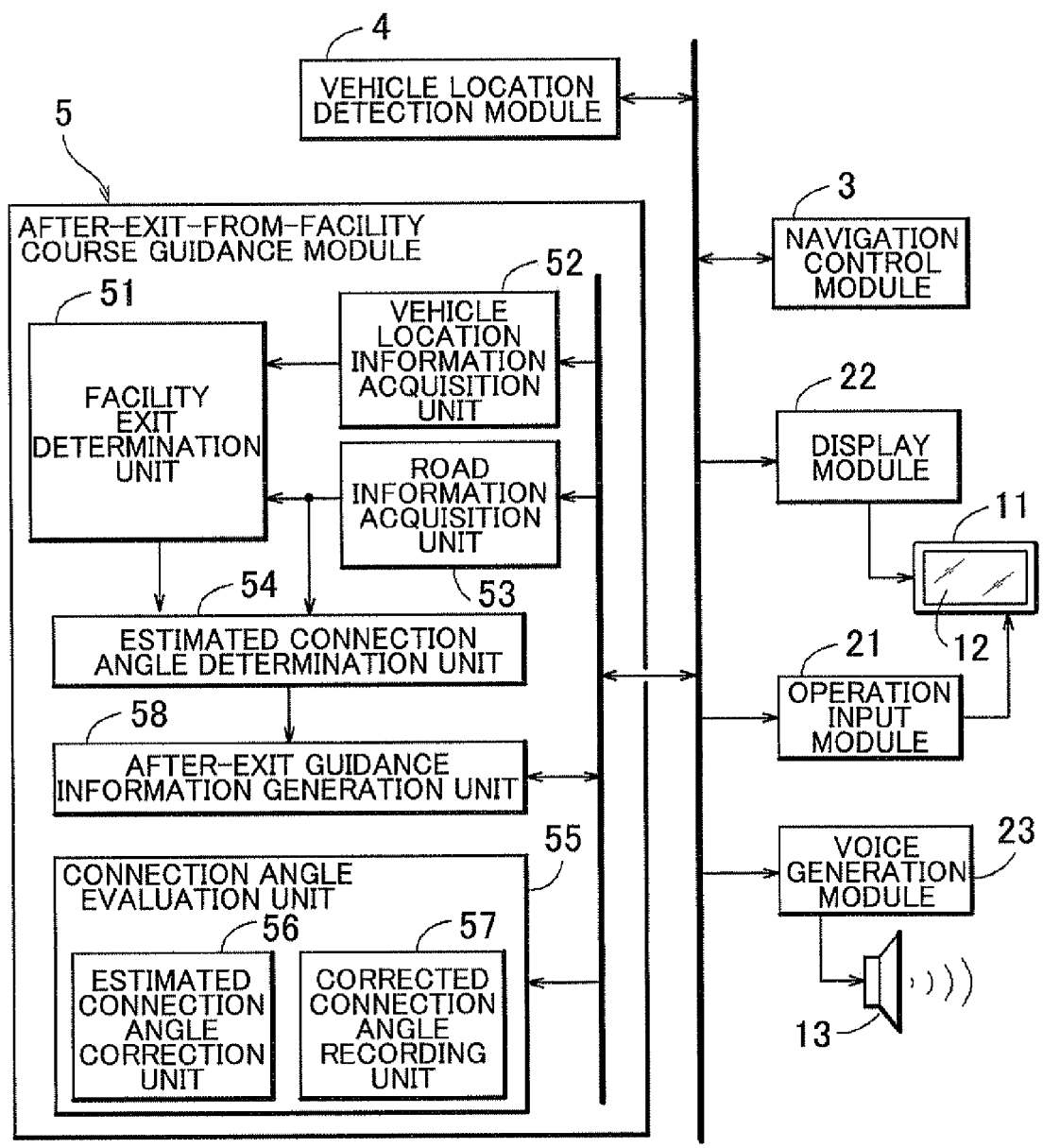
FIG. 3 is a functional block diagram showing the function of the course guidance system in the vehicle navigation device shown in FIG. 2.

The after-exit-from-facility course guidance module 5, a key component of the course guidance system, gives guidance information on the traveling direction information on an out-of-facility road connecting to the exit/entrance when a vehicle exits from the exit/entrance of a facility such as a parking lot or a factory. At the same time, the after-exit-from-facility course guidance module 5 has the function to calculate the direction of the exit lane via which the vehicle exits from the facility to the out-of-facility road, that is, to calculate the connection angle with the out-of-facility road. For this purpose, the after-exit-from-facility course guidance module 5 includes a facility exit determination unit 51, a vehicle location information acquisition unit 52, a road information acquisition unit 53, an estimated connection angle determination unit 54, a connection angle evaluation unit 55, and an after-exit guidance information generation unit 58 as shown in FIG. 3.

The vehicle location information acquisition unit 52 acquires vehicle location information, transmitted from the vehicle location detection module 4 and indicating the current location of the vehicle, and gives this information to the facility exit determination unit 51. This vehicle location information also includes information indicating that the vehicle has entered the exit lane that is the exit/entrance of the facility such as a parking lot. Therefore, the facility exit determination unit 51 knows from this vehicle location information that the vehicle is traveling in the exit lane to exit from the parking lot. The road information acquisition unit 53 acquires road information on the out-of-facility road, connecting to the exit/entrance (for example, exit lane) of the facility such as a parking lot, from the road map database 91 based on the vehicle location information. The road information includes not only information on a road link, connected by nodes, as a main component but also information on an intersection node representing an intersection between multiple roads and on an exit/entrance node representing the location of the facility exit/entrance on a road link. When it is determined that the vehicle is exiting from the facility to an out-of-facility road, the facility exit determination unit 51 issues a course guidance request.

In response to the course guidance request, the estimated connection angle determination unit 54 determines the estimated connection angle that is the connection angle estimated for the in-facility exit lane, which connects to the exit/entrance node, at the exit/entrance node. Based on the estimated connection angle determined by the estimated connection angle determination unit 54, the after-exit guidance information generation unit 58 generates the course guidance information that is the guidance on the direction of traveling to the guidance road that is the guidance road on which the vehicle will travel after exiting from the exit lane. To generate this information, the after-exit guidance information generation unit 58 receives the road information on the area around the exit/entrance node read by the road information acquisition unit 53 and the estimated connection angle of the exit lane determined by the estimated connection angle determination unit 54. From the connection angle of the guidance road at the exit/entrance node obtained from the received road information and the estimated connection angle of the exit lane, the after-exit guidance information generation unit 58 calculates the direction (traveling direction) of the guidance road based on the traveling direction of the vehicle that is traveling in the exit lane. In this case, the connection angle of the guidance road at the exit/entrance node is the angle based on the absolute direction at the point of connection to the exit/entrance node (for example, angle determined with the north as 0-degree), the angle based on a predetermined longitude line or latitude line, or the angle based on the base road. Based on the direction of the guidance road calculated in this way, the after-exit guidance information generation unit 58 creates course guidance information such as "travel diagonally left," "travel diagonally right," or "travel left." This course guidance information may use graduated expressions such as "straight on," "diagonally right (left)," "right (left)," or "sharply right (left)" or may use direct expressions of the angle of the traveling direction after passing through the exit/entrance node with respect to the traveling direction of the vehicle, such as "right (left) 30 degrees" and "right (left) 45 degrees."

The operation of the connection angle evaluation unit 55 is triggered by the angle correction request. This request is issued when it is detected that the actual traveling road after exiting from the exit lane differs from the guidance road based on the vehicle location and the road information and, in this example, based on the result of map matching by the map matching unit 45 using the vehicle location information and the road information. The connection angle evaluation unit 55 includes an estimated connection angle correction unit 56 and a corrected connection angle recording unit 57. The estimated connection angle correction unit 56 calculates the correction amount of the estimated connection angle at the exit/entrance node based on the relative angle between the traveling road and the guidance road and corrects the estimated connection angle. The corrected connection angle recording unit 57 records the estimated connection angle that has been corrected. The estimated connection angle correction unit 56, which performs the algorithm of the estimated connection angle correction principle described with reference to FIG. 1, derives the correction amount of the estimated connection angle using the angle of the guidance road with respect to the mismatching traveling road and the estimated connection angle as the input parameters.

The connection angle evaluation unit 55 is configured to correct the estimated connection angle at the exit/entrance node when a mismatch between the traveling road and the guidance road is detected at the same exit/entrance a predetermined number of times, based on the relative angle between the traveling road and guidance road detected at each of the predetermined number of times. That is, when a mismatch between the traveling road and the guidance road is found, the estimated connection angle correction unit 56 corrects the estimated connection angle. In this case, each time a mismatch is found, the estimated connection angle correction unit 56 corrects the estimated connection angle using the relative angles obtained so far and the relative angle obtained by performing the statistical calculation for the relative angles. Instead of this configuration, the connection angle evaluation unit 55 may have a configuration in which the connection angle evaluation unit 55 calculates the corrected estimated connection angle each time a mismatch is found and performs the statistical calculation for those angles to produce the corrected estimated connection angle. Both configurations produce the same result. The statistical calculation in this case refers to the calculation to produce the average, median, or mode from the corrected estimated connection angles that are recorded. Instead of such a statistical calculation, it is also possible to employ a method in which the estimated connection angle is updated by each correction amount derived by the connection angle evaluation unit 55. In all cases, the corrected estimated connection angle calculated by the estimated connection angle correction unit 56 is recorded in the corrected connection angle recording unit 57.

Therefore, the estimated connection angle determination unit 54 determines the estimated connection angle either using the corrected estimated connection angle if the corrected estimated connection angle, which is the estimated connection angle that has been corrected, is recorded, or using the predetermined initial estimated connection angle if the corrected estimated connection angle is not recorded. In this example, the initial estimated connection angle is set as 90 degrees to the road link representing a base road that is the out-of-facility road as shown by the illustration in #3 in FIG. 1. That is, when the initial estimated connection angle is used, the estimated connection angle determination unit 54 determines the direction orthogonal to the base road as the direction of the exit lane. In this case, one ideal example of the base road is an out-of-facility road to which the exit/entrance of the facility is connected and whose road link extending through the exit/entrance node, which represents the point of connection to the exit/entrance, forms one straight line across both sides of the exit/entrance node. In many cases, such a base road is a road running along the outer edge of the facility having the exit/entrance. And, in many cases, the in-facility exit lane extending towards the exit/entrance is orthogonal or approximately orthogonal to such a base road at least near to the exit/entrance and, therefore, it is most ideal to set the initial estimated connection angle as 90 degrees. Note that the initial estimated connection angle may be set to an angle other than 90 degrees.

A mismatch between the traveling road and the guidance road, which causes the connection angle evaluation unit 55 to start its operation, is generated basically by a geographical condition in which the exit lane is connected to an intersection. This geographical condition means a geographical match between the exit/entrance node and the intersection node. However, when the exit/entrance node is near to an intersection node, the system also performs course guidance at the intersection as the after-exit course guidance while the vehicle is traveling in the exit lane and, therefore, the substantially the same situation occurs. This means that the operation of the connection angle evaluation unit 55 should ideally be performed when the exit/entrance node is located within a predetermined distance, for example, several meters to 20 meters, from an intersection node. In this example, the connection angle evaluation unit 55 is configured to perform its processing when a vehicle exits from the facility through the exit/entrance node within a predetermined distance, for example, 10 meters or shorter, from an intersection node.

Figure 4A:
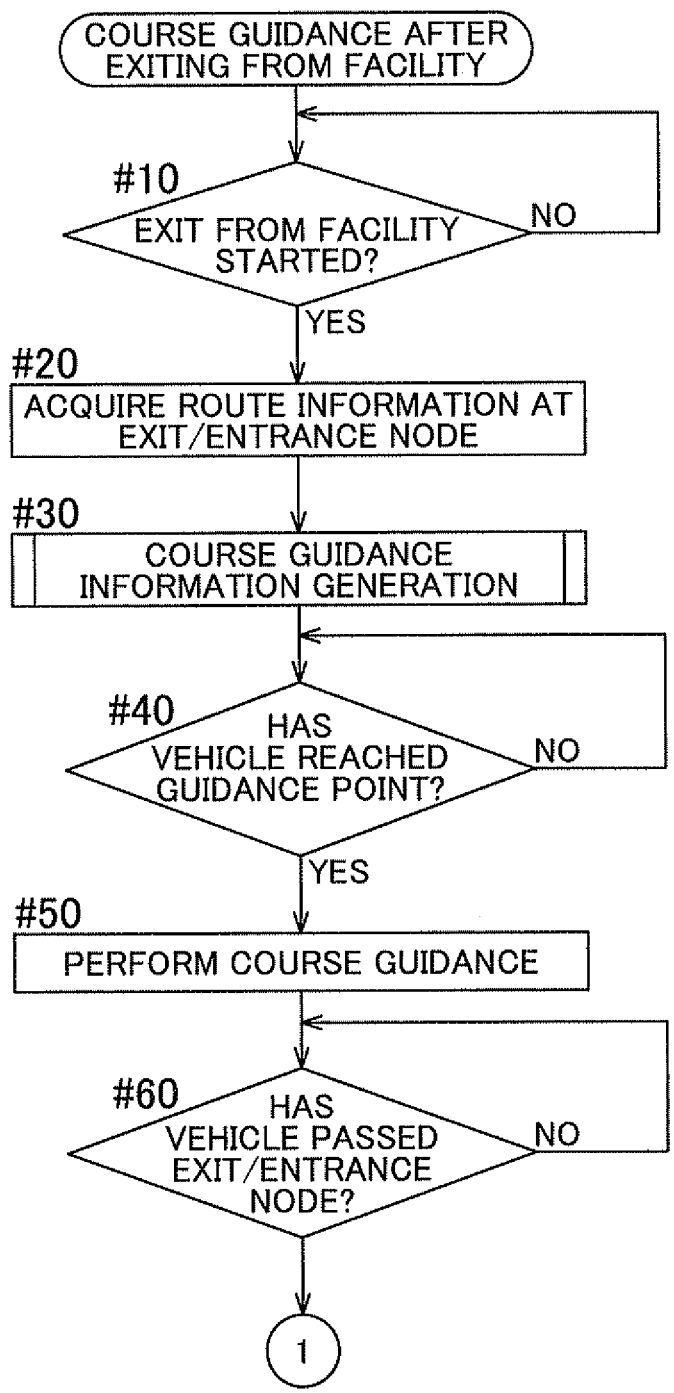
FIGS. 4A and 4B show a flowchart showing an example of the main algorithm of course guidance control in the course guidance system.
Figure 4B:
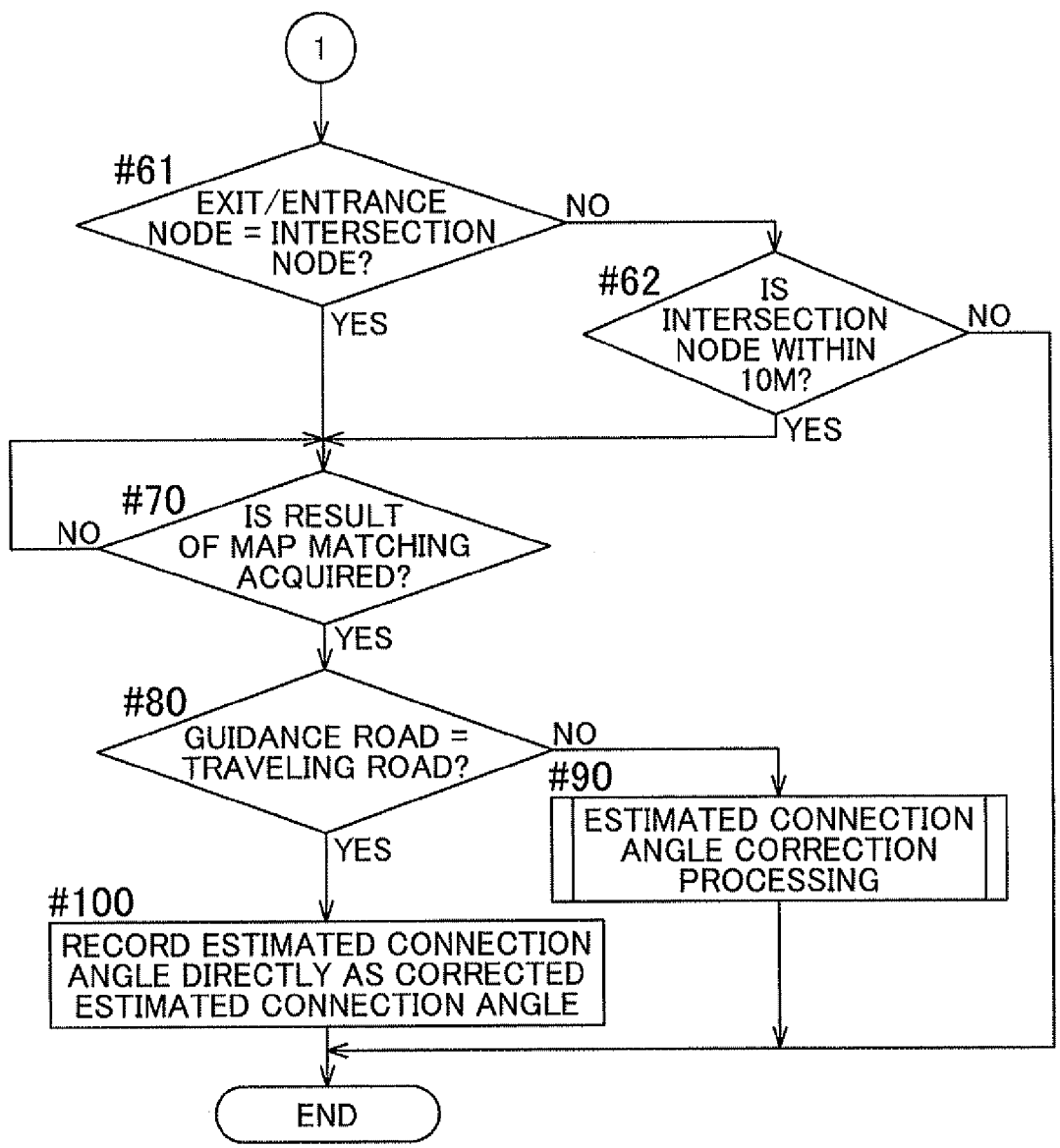

FIGS. 4A and 4B are an algorithm showing an exemplary course guidance control method. The algorithm may be implemented in the form of a computer program stored in a RAM and/or ROM and executed by the after-exit-from-facility course guidance module 5; however, it should be appreciated that the method need not be limited by any of the structure of the above-described navigation device.

First, the facility exit determination unit 51 checks if the vehicle has started exiting from the facility (#10). If it is confirmed that the vehicle has entered, or is traveling in, the exit lane (Yes in #10), the road information acquisition unit 53 acquires guidance route information that corresponds to the exit/entrance node, to which the exit lane is connected, and that is the guidance route information for traveling to the destination (#20). After that, the after-exit guidance information generation unit 58 generates the course guidance information using the contents of the acquired guidance route information (#30).

The course guidance information is created based on the course guidance information generation algorithm shown in FIG. 5. First, the estimated connection angle determination unit 54 determines the connection angle to the exit/entrance node of this exit lane. At this time, the estimated connection angle determination unit 54 checks if the estimated connection angle (corrected estimated connection angle) is recorded because, if course guidance was performed before at this exit/entrance node, the estimated connection angle should be recorded (#33). If the estimated connection angle is not recorded (No in #33), the estimated connection angle determination unit 54 determines the initial estimated connection angle, that is, 90 degrees to the base road, as the estimated connection angle as described above (#34). If the estimated connection angle is recorded (Yes in #33), the estimated connection angle determination unit 54 reads the recorded estimated connection angle (#35). If one estimated connection angle is recorded, the estimated connection angle determination unit 54 determines the recorded angle directly as the estimated connection angle; if multiple estimated connection angles are recorded, the estimated connection angle determination unit 54 determines the statistical calculation result as the estimated connection angle (#36).

In either case, when the estimated connection angle is determined, the after-exit guidance information generation unit 58 reads the connection angle at the exit/entrance node of the guidance road, which is the course from the exit/entrance node, from the road information (#37). After that, based on the estimated connection angle, which is the connection angle of the exit lane at the exit/entrance node, and the connection angle of the guidance road at the exit/entrance node, the after-exit guidance information generation unit 58 calculates the entering angle to the guidance road as viewed from the vehicle traveling in the exit lane (#38). In addition, based on the calculated entering angle to the guidance road, the after-exit guidance information generation unit 58 creates the course guidance information such as "travel diagonally left" (#39).

When the course guidance information is created, the after-exit-from-facility course guidance module 5 checks if the vehicle has reached the guidance point at which this course guidance is to be output (#40) and, if the vehicle has reached the guidance point (Yes in #40), performs course guidance at least via a voice notification (#50). After that, the after-exit-from-facility course guidance module 5 waits until the vehicle passes the exit/entrance node (No in #60). When the vehicle has passed the exit/entrance node (Yes in #60), the connection angle evaluation unit 55 checks if the exit/entrance node is an intersection node (#61). If the exit/entrance node is not an intersection node (No in #61), the connection angle evaluation unit 55 further checks if there is an intersection node within 10 m of the exit/entrance node (#62). If there is no intersection node within 10 m of the exit/entrance node (No in #62), the connection angle evaluation unit 55 terminates this routine assuming that the exit lane is connected only to one road. If the exit/entrance node is an intersection node (Yes in #61) or if there is an intersection node within 10 m of the exit/entrance node (Yes in #62), the connection angle evaluation unit 55 assumes that this exit lane is actually connected to two or more roads. In this case, the connection angle evaluation unit 55 performs the evaluation as follows.

That is, the connection angle evaluation unit 55 waits until the result of map matching, which is performed after the vehicle passed the exit/entrance node, is acquired (No in #70). If the result of map matching is acquired (Yes in #70), the connection angle evaluation unit 55 checks the result to see if the traveling road matches the guidance road, that is, if the vehicle is traveling according to the guidance (#80). If the vehicle is traveling according to the guidance (Yes in #80), the connection angle evaluation unit 55 records the estimated connection angle, determined in steps #34 and #36, directly (assuming that no change is made) in the corrected connection angle recording unit 57 as the corrected estimated connection angle (#100). If the vehicle is not traveling according to the guidance (No in #80), the connection angle evaluation unit 55 records the corrected value, obtained by the estimated connection angle correction processing (#90) that will be described below, as the corrected estimated connection angle and terminates this after-exit-from-facility course guidance routine (main routine).

Figure 6:
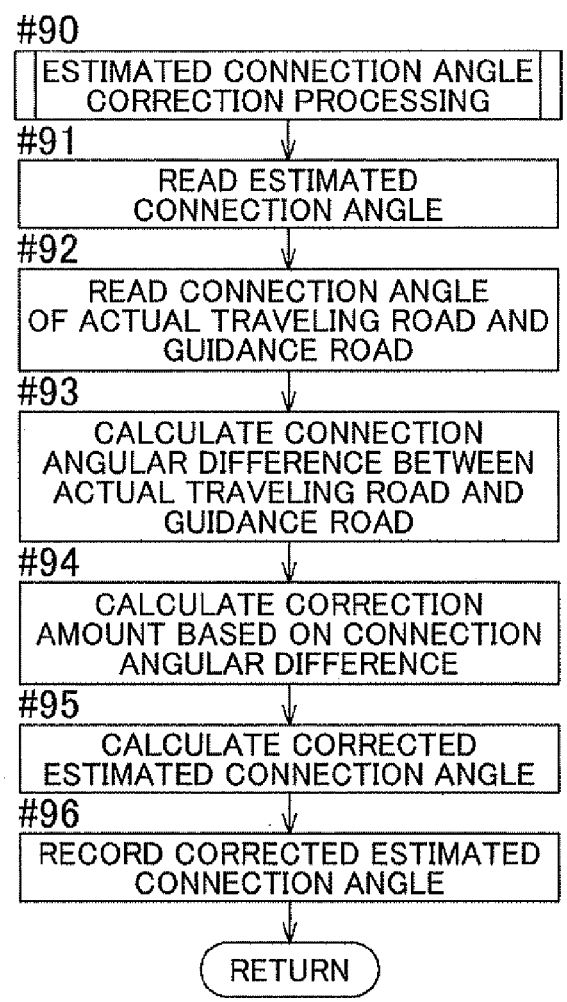
FIG. 6 is a flowchart showing the estimated connection angle correction algorithm used in the main algorithm.

In the estimated connection angle correction processing, the estimated connection angle correction unit 56 reads the above-described estimated connection angle at the exit/entrance node with respect to the base road, which is determined in steps #34 or #36, as shown in FIG. 6 (#91). In addition, the estimated connection angle correction unit 56 reads the connection angle at the exit/entrance node of each of the actual traveling road and the guidance road from the road information (#92). As with the connection angle of the guidance road, the connection angle of the actual traveling road at the exit/entrance node is the angle based on the absolute direction at the point of connection to the exit/entrance node (for example, angle determined with the north as 0-degree), the angle based on a predetermined longitude line or latitude line, or the angle based on the base road. Next, the estimated connection angle correction unit 56 calculates the angular difference between the connection angle of the actual traveling road and the connection angle of the guidance road (#93). From the fact that the driver selected a wrong course, that is, the actual traveling road instead of the guidance road, regardless of the course guidance information generated based on the entering angle from the exit lane to the guidance road, it is determined that the entering angle from the exit lane, which was used in the guidance, corresponds to the actual traveling road rather than to the guidance road. Based on this fact, the estimated connection angle correction unit 56 corrects the estimated connection angle as shown schematically in FIG. 7. In the example in FIG. 7, it is assumed that the road link of the base road connected to the facility exit/entrance at the exit/entrance node extends in the left to right direction in the figure. According to the message "diagonally left" notified by the course guidance performed on the assumption that the vehicle is traveling in the virtual exit lane, the vehicle actually travels, not on the correct guidance road, but on a road shifted θ degrees in the counterclockwise direction, meaning that the correction amount is the angle θ in the counterclockwise direction. Therefore, the corrected estimated connection angle of the virtual exit lane, which has been corrected, is (θ+α). That is, the estimated connection angle correction unit 56 calculates the angular difference θ between the guidance road and the actual traveling road as the correction amount of the estimated connection angle at the exit/entrance node of the exit lane (#94), corrects the estimated connection angle using this correction amount, and determines the resulting estimated connection angle as the corrected estimated connection angle (#95). The corrected connection angle recording unit 57 records the calculated corrected estimated connection angle (#96).

Figure 7:
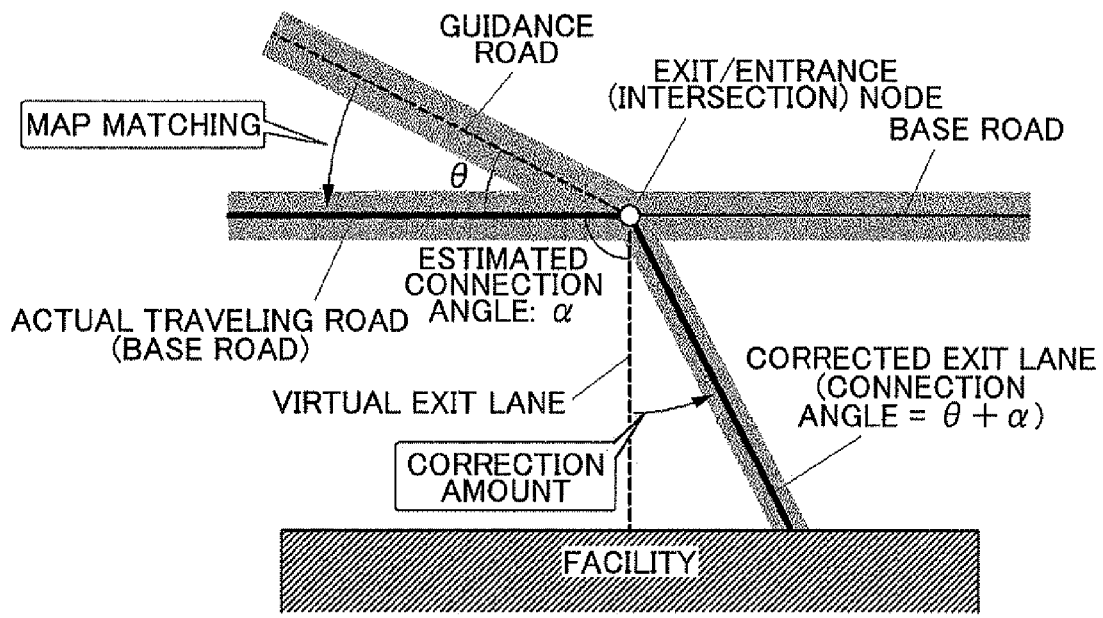
FIG. 7 is a schematic diagram illustrating the correction of an estimated connection angle with respect to the base line of a virtual exit lane.
Figure 8:
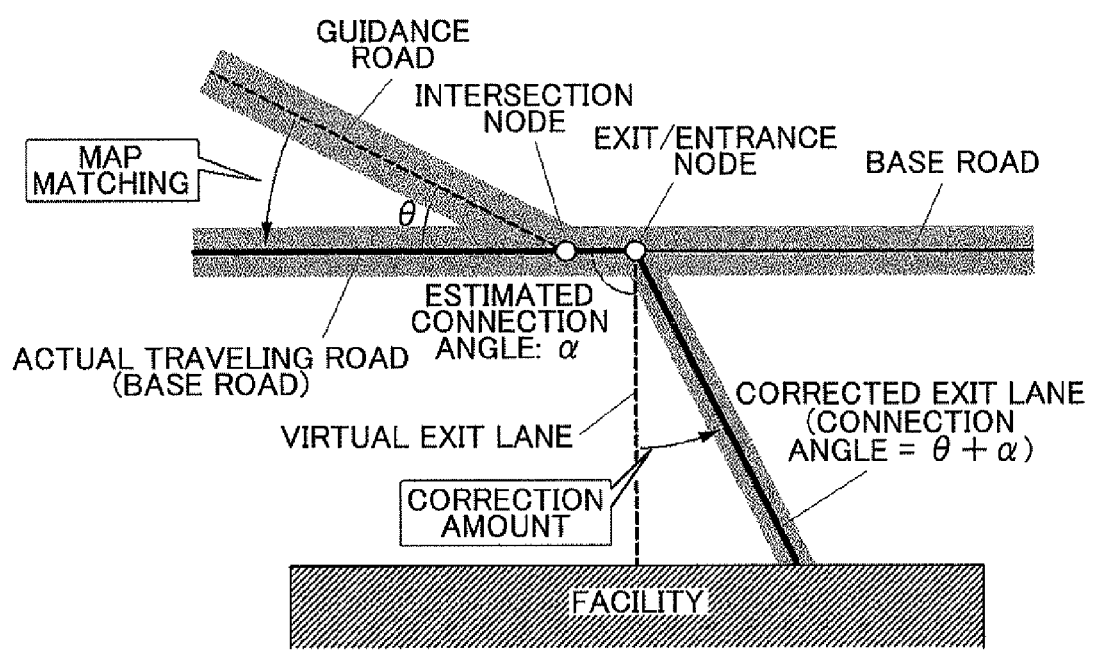
FIG. 8 is a schematic diagram illustrating the correction of an estimated connection angle with respect to the base line of a virtual exit lane when the exit/entrance node and an intersection node are near.

FIG. 8 is a diagram showing an example, different from that in the in FIG. 7, in which the exit/entrance node and the intersection node do not match but are near. As shown in this figure, when the exit/entrance node and the intersection node are near (for example, the distance is 10 m or shorter) and the road has a predetermined road width, the facility exit/entrance is assumed to be substantially at the intersection. In such a case, the estimated connection angle correction algorithm described with reference to FIG. 7 is applicable.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying inventive principles.

For example, (1) although the vehicle location is detected by a combination of the GPS method, dead reckoning navigation method, and image matching method in the example described above, all of those methods need not always be combined but some of those three may be combined. Because there is no limitation on the vehicle location detection method, any vehicle location detection method other than those described above may be used.

(2) Image matching is ideally used for determining that a vehicle is exiting to an out-of-facility road. Image matching, however, requires the preparation of a reference image that is created from the captured image of the exit/entrance area including the exit lane. If such a reference image is not prepared, it is possible to employ a detection method in which a character image, such as "EXIT" included in the captured image, is recognized as characters. If the information on a road connecting to the exit/entrance can be received from the facility via communication, the system may be configured to detect a vehicle, which is exiting from the facility, based on the information.

(3) Although a parking lot is used in the description of the above example as a facility to which the disclosed technology, the disclosed technology is applicable also to other facilities such as a factory, a school, a commercial establishment, and so on.

The course guidance system is applicable not only to a system that works with a vehicle navigation device but also to a standalone guidance system used only for vehicles exiting from a facility.

What is claimed is:

1. A course guidance system, comprising:
a controller that:
acquires vehicle location information indicating a current location of a vehicle;
acquires road information including information on a road link and information on an exit/entrance node, the road link indicating an out-of-facility road, the exit/entrance node indicating a location of an exit/entrance of a facility having an exit lane connected to the out-of-facility road at the exit/entrance node;
determines that the vehicle is exiting from the facility to the out-of-facility road;
determines an estimated connection angle of the exit lane at the exit/entrance node;
generates course guidance information based on the determined estimated connection angle when the vehicle is determined to be exiting, the course guidance information being guidance on a traveling direction to a guidance road, the guidance road forming part of a guidance route on which the vehicle will travel after exiting from the exit lane;
based on the vehicle location information and the road information, detects whether an actual traveling road and the guidance road differ, the actual traveling road being a road on which the vehicle will travel after exiting from the exit lane;
when the actual traveling road and the guidance road differ, based on the vehicle location information and the road information, corrects the estimated connection angle at the exit/entrance node based on a relative angle between the actual traveling road and the guidance road; and
records the corrected estimated connection angle.

2. The course guidance system according to claim 1, wherein the controller:
when it is detected a predetermined number of times that the traveling road differs from the guidance road at the exit/entrance node, corrects the estimated connection angle at the exit/entrance node based on the relative angle between the traveling road and the guidance road each of the predetermined number of times.

3. The course guidance system according to claim 1, wherein the controller:
determines the corrected estimated connection angle when the corrected estimated connection angle is recorded; or
when the corrected estimated connection angle is not recorded, uses a predetermined initial estimated connection angle.

4. The course guidance system according to claim 1, wherein:
   the road information further includes information on an intersection node indicating an intersection of a plurality of roads; and
   the controller, when the exit/entrance node is located within a predetermined distance from the intersection node, detects whether the actual traveling road and the guidance road differ.

5. The course guidance system according to claim 1, wherein the controller:
   acquires the recorded estimated connection angle;
   calculates an entering angle from the exit lane to the guidance road; and
   provides course guidance based on the calculated entering angle.

6. A navigation device comprising the course guidance system according to claim 1.

7. A course guidance method, executed on a computer comprising:
   acquiring vehicle location information indicating a current location of a vehicle;
   acquiring road information including information on a road link and information on an exit/entrance node, the road link indicating an out-of-facility road, the exit/entrance node indicating a location of an exit/entrance of a facility having an exit lane connected to the out-of-facility road at the exit/entrance node;
   determining that the vehicle is exiting from the facility to the out-of-facility road;
   determining an estimated connection angle of the exit lane at the exit/entrance node;
   generating course guidance information based on the determined estimated connection angle when the vehicle is determined to be exiting, the course guidance information being guidance on a traveling direction to a guidance road, the guidance road forming part of a guidance route on which the vehicle will travel after exiting from the exit lane;
   based on the vehicle location information and the road information, detecting whether an actual traveling road and the guidance road differ, the actual traveling road being a road on which the vehicle will travel after exiting from the exit lane;
   when the actual traveling road and the guidance road differ, based on the vehicle location information and the road information, correcting the estimated connection angle at the exit/entrance node based on a relative angle between the actual traveling road and the guidance road; and
   recording the corrected estimated connection angle.

8. The course guidance method according to claim 7, further comprising:
   when it is detected a predetermined number of times that the traveling road differs from the guidance road at the exit/entrance node, correcting the estimated connection angle at the exit/entrance node based on the relative angle between the traveling road and the guidance road each of the predetermined number of times.

9. The course guidance method according to claim 7, further comprising:
   determining the corrected estimated connection angle when the corrected estimated connection angle is recorded; or
   when the corrected estimated connection angle is not recorded, uses a predetermined initial estimated connection angle.

10. The course guidance method according to claim 7, wherein:
    the road information further includes information on an intersection node indicating an intersection of a plurality of roads; and
    the method further comprises, when the exit/entrance node is located within a predetermined distance from the intersection node, detecting whether the actual traveling road and the guidance road differ.

11. The course guidance method according to claim 7, further comprising:
    acquiring the recorded estimated connection angle;
    calculating an entering angle from the exit lane to the guidance road; and
    providing course guidance based on the calculated entering angle.

12. The course guidance method according to claim 7, wherein the method is implemented by a navigation device.

13. A non-transitory computer-readable storage medium storing a computer-executable course guidance program, the program comprising:
    instructions for acquiring vehicle location information indicating a current location of a vehicle;
    instructions for acquiring road information including information on a road link and information on an exit/entrance node, the road link indicating an out-of-facility road, the exit/entrance node indicating a location of an exit/entrance of a facility having an exit lane connected to the out-of-facility road at the exit/entrance node;
    instructions for determining that the vehicle is exiting from the facility to the out-of-facility road;
    instructions for determining an estimated connection angle of the exit lane at the exit/entrance node;
    instructions for generating course guidance information based on the determined estimated connection angle when the vehicle is determined to be exiting, the course guidance information being guidance on a traveling direction to a guidance road, the guidance road forming part of a guidance route on which the vehicle will travel after exiting from the exit lane;
    instructions for, based on the vehicle location information and the road information, detecting whether an actual traveling road and the guidance road differ, the actual traveling road being a road on which the vehicle will travel after exiting from the exit lane;
    instructions for, when the actual traveling road and the guidance road differ, based on the vehicle location information and the road information, correcting the estimated connection angle at the exit/entrance node based on a relative angle between the actual traveling road and the guidance road; and
    recording the corrected estimated connection angle.

14. The storage medium according to claim 13, the program further comprising:
    instructions for, when it is detected a predetermined number of times that the traveling road differs from the guidance road at the exit/entrance node, correcting the estimated connection angle at the exit/entrance node based on the relative angle between the traveling road and the guidance road each of the predetermined number of times.

15. The storage medium according to claim 13, the program further comprising:
    instructions for determining the corrected estimated connection angle when the corrected estimated connection angle is recorded; or instructions for, when the corrected estimated connection angle is not recorded, uses a predetermined initial estimated connection angle.

16. The storage medium according to claim 13, wherein:

the road information further includes information on an intersection node indicating an intersection of a plurality of roads; and the program further comprises instructions for, when the exit/entrance node is located within a predetermined distance from the intersection node, detecting whether the actual traveling road and the guidance road differ.

17. The storage medium according to claim 13, the program further comprising:

instructions for acquiring the recorded estimated connection angle;

instructions for calculating an entering angle from the exit lane to the guidance road; and instructions for providing course guidance based on the calculated entering angle.

* * * * *